Inventor
Ronald Wildgoose
By
Cushman, Darby & Cushman
Attorneys

United States Patent Office 3,296,081
Patented Jan. 3, 1967

3,296,081
NUCLEAR REACTORS
Ronald Wildgoose, Derby, England, granted to United States Atomic Energy Commission under the provisions of 42 U.S.C. 2182
Filed Nov. 21, 1960, Ser. No. 70,543
Claims priority, application Great Britain, Nov. 21, 1959, 39,581/59
7 Claims. (Cl. 176—19)

This invention relates to a device for indicating the position of a movable member relatively to fixed structure.

According to the invention, either the movable member or the fixed structure carries a pair of coils forming part of a transformer in which one of the transformer windings is in two parts in series opposition, whereby the output of the transformer is zero when it is surrounded by a uniform dielectric, and the fixed structure or rod respectively has a portion of uniform magnetic material followed by a gap in the magnetic material such that the gap is opposite a portion of the transformer winding when the member is in one position only, thus resulting in an output from the transformer in this position.

Preferably the device is applied to indication of the lowermost position of a rod such as a control rod of a nuclear reactor.

In this case the rod can have a hollow extension of magnetic material with a recess adjacent its upper end. Within the hollow extension can be carried a fixed pair of formers on which are wound the transformer windings referred to above. The arrangement will be such that the recess will be opposite a portion of the transformer windings when the rod is in its lowermost position.

The fixed part carrying the transformer windings preferably also carries a further series of windings on formers spaced longitudinally along the fixed member, the windings being connected in series and arranged in a bridge circuit to indicate the general position of the rod independently of the final bottom position indication. This of course requires either that the recess in the upper end of the hollow extension shall extend upwardly for at least the length of the further series of windings, or that the further windings have progressively different numbers of turns so that the inductance of all the further windings in series will vary as the rod is moved from one extreme position to the other.

We prefer to employ the output of the transformer which gives bottom position indication to operate a two-position visual indicator which may comprise an electromagnetically controlled signal device, and to allow the power rating and hence the size of the transformer to be kept small, it is convenient to use a transistor amplifier between the transformer secondary and the indicator. While provision may be made for switching a single amplifier and indicator to check the bottom position of a plurality of control rods or the like, where the bottom position indicator is of special importance, as with the control rods of a nuclear reactor, we prefer to provide a separate amplifier and indicator permanently connected to the transformer for each rod.

The general position indication may also be given by separate indicators for each rod, but as in this connection a simultaneous indication for each rod is of less importance, we prefer to provide switching whereby a single indicator may be connected to the further windings of any desired rod as requisite, or if desired to standard test coils for checking purposes. The indicator used here is preferably a meter arranged to receive the rectified output from an Anderson A.C. bridge, in which the further windings are connected in one arm i.e. as an inductance to be measured. The bridge may be balanced by adjustment of one or more preset impedance elements at one extreme position of the rod (provision being made for switching to D.C. supply and by-passing the meter rectifier for initial balancing) and then movement of the rod will produce progressively increasing unbalance of the bridge and hence a progressively increasing meter reading.

It is desirable to provide some check on the state of the various circuits, more particularly of the circuits for bottom position indication. We prefer to provide an additional amplifier, operating from the same power supplies as the amplifiers associated with the control rod bottom position indication circuits, and to connect the input to said further amplifier to the input circuit for the primaries of the control rod transformers. Then a lamp or like indicator connected to the output of said further amplifier gives an immediate warning should the amplifier or transformer primary power supplies fail. If desired, provision may be made for testing the operation of the individual amplifiers for the bottom position indication, and for this purpose we prefer to provide switching whereby the input of any one of said individual amplifiers may be connected to an A.C. source controllable to give either of two preset voltages corresponding to desired operate and nonoperate levels for the indicator.

In order that the invention may be well understood, a preferred embodiment thereof will now be described in more detail, with reference to the drawings.

In the drawings accompanying the provisional specification:

Figure 1:
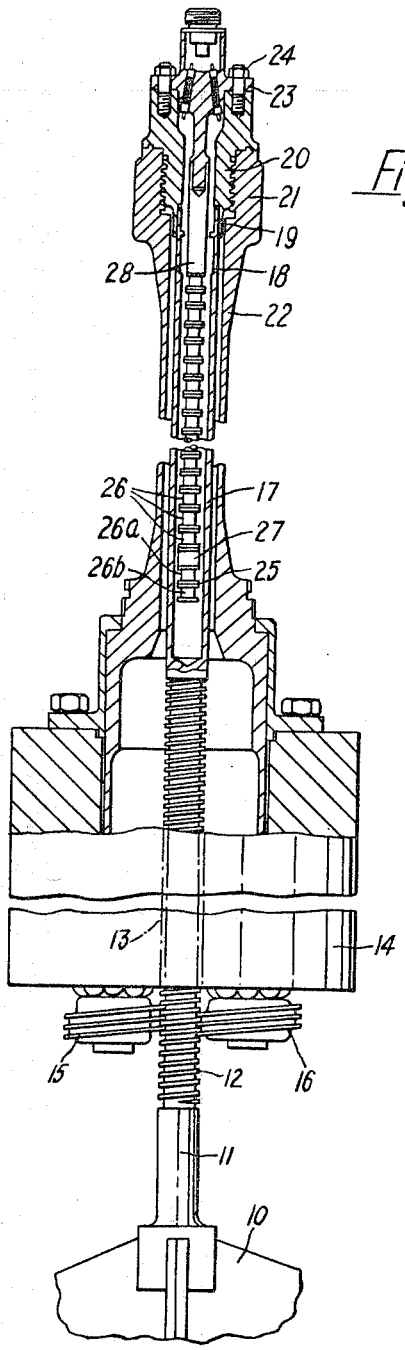
FIGURE 1 shows diagrammatically a section through a rod position indicator mechanism embodying this invention.

In FIGURE 1 is shown an upper part 10 of a control rod such as may be used in a nuclear reactor, the control rod 10 terminating in an upper stem 11 attached to a lead screw 12 carried in a bore 13 in a fixed block 14.

The lead screw 12 is engaged by nuts 15 and 16 which are freely rotatable and can be driven in a direction to raise or lower the lead screw 12 as required. The nuts 15 and 16 are also capable of lateral movement by a mechanism, not shown, so as to release the lead screw 12 and control rod 10 and allow it to drop rapidly into the reactor core for actual shut-down of the reactor.

Above the lead screw 12 the stem has a hollow portion 17 terminating in a sleeve 18 slidably engaged in an extension 19 of a plug 20. The plug 20 is screwed into the upper end 21 of a sleeve 22 which is attached to block 14 by means of a flange member 23 held by bolts 24.

Within the hollow portion 17 of the control rod stem there is situated a position sensing device 25 consisting of a number of coils formers 26. The lowermost coil formers 26a and 26b are separated from the adjacent formers by a nonmagnetic spacer 27 and the remainder of the formers 26 are supported from the upper part of the control indicator device by a nonmagnetic portion 28.

All of the formers except 26a and 26b are wound with coils connected in series which may be switched into a bridge circuit to give a general position indication as will later be described. The lowermost coils 26a and 26b alone are used to give an indication that the rod 10 is in its fully down position.

Figure 2:
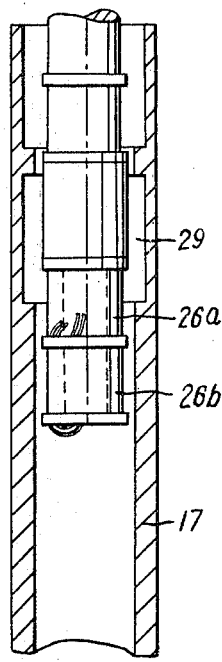
FIGURE 2 is an enlarged section of a portion of FIGURE 1.

As shown in FIGURE 2 the hollow portion 17 of the control rod stem has near its upper end a recess 29, the hollow portion being made of a metal having good magnetic properties.

Figure 3:
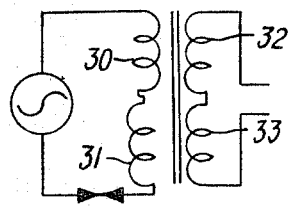
FIGURE 3 is a diagrammatic electric circuit.

Coils 26a and 26b are wound as a transformer of the form shown in FIGURE 3, comprising primary windings 30 and 31 connected in series opposition, and secondary windings 32 and 33 in series-aiding relation. The transformer is of the type having a linear air gap. Thus the whole assembly of coils 26a and 26b constitute a transformer which, if it is contained within a uniform metal shaft, so that the magnetic circuits of the two coils are similar, will produce no output upon energisation of the primary windings, since the voltages induced in the two secondary windings cancel out.

If, however, one of the coils 26a, 26b is opposite a gap in the shaft, for example gap 29 in the hollow portion 17 of the control rod stem, then the reluctance of the magnetic circuit of that one of the coils will increase resulting in a decreased output from the secondary winding of the one coil, and therefore an output from the transformer as a whole.

When the control rod is in any position except its fully lowered position there will be no output from the secondary windings of 26a and 26b, but when the control rod is in its fully lowermost position the gap 29 (as shown in FIGURE 2) will be directly opposite a portion of windings 26a and, therefore, the transformer will produce an output whose presence thus indicates that the rod is in its lowermost position.

Figure 4:
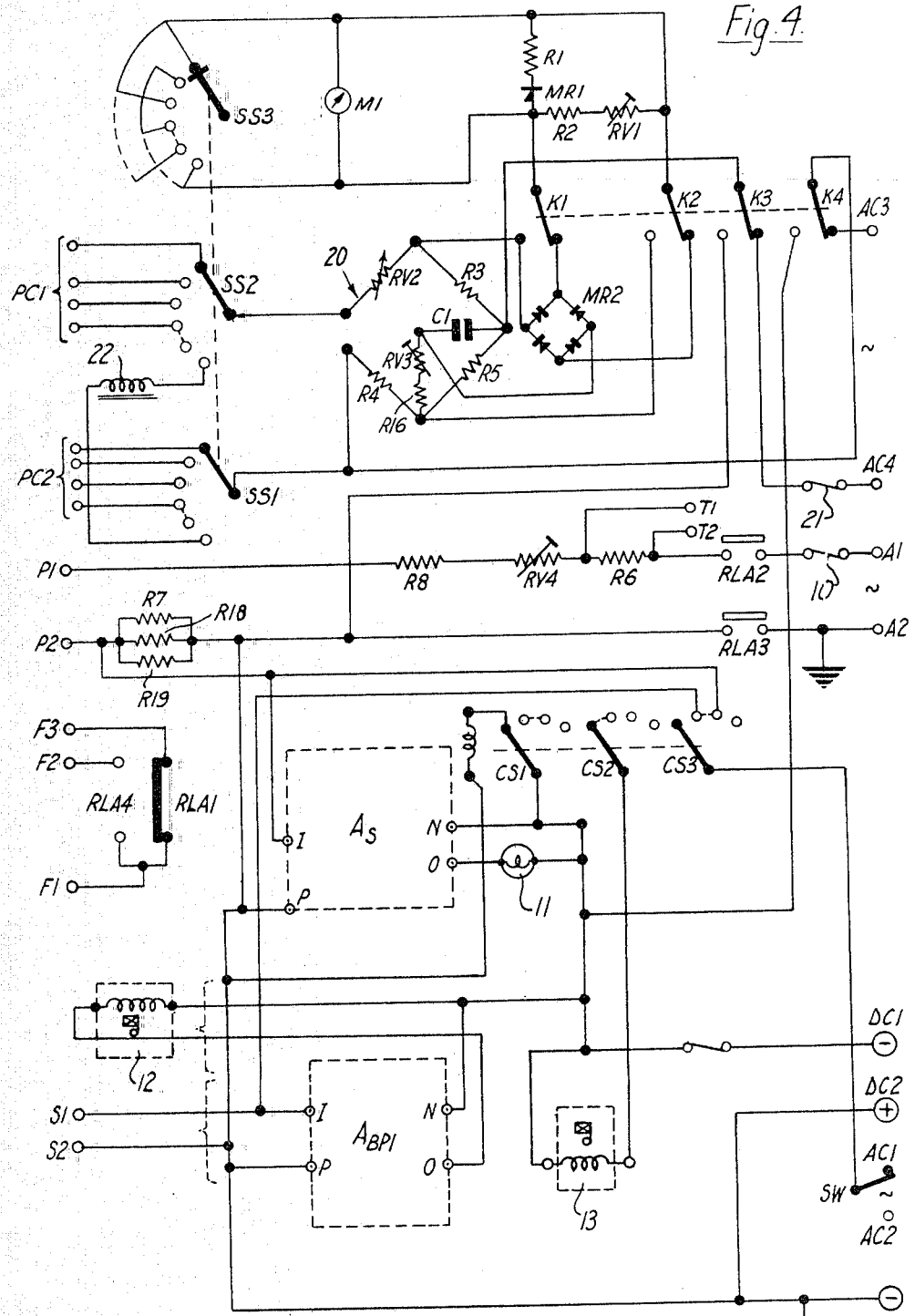
FIGURE 4 is a diagram of an electrical circuit including provision for both bottom and general position indication.

Reference will now be made to FIGURE 4 of the drawings, and first consideration will be given to those parts of the circuit there shown which are associated with bottom position indication. To avoid unnecessary repetition, FIGURE 4 only includes all the components for bottom position indication of one control rod, it being understood that the circuits associated with the coils on formers 26 of the other control rods will be identical with the one circuit shown in full. The various windings mentioned in the above description of the mechanised parts of the apparatus are not shown in FIGURE 4, but at the left hand edge of this figure are shown terminals P1, P2 to which the primary windings (all connected in series) of the transformers for bottom position indication of the control rods are to be connected, terminals S1, S2 for connection to the secondary winding of one of said transformers, and terminal groups PC1, PC2 for connection to the windings for general position indication.

Also there are shown terminals $F_1$, $F_2$ and $F_3$ for connection to a remote fault indicator circuit mentioned hereinafter although not shown or described in detail.

First considering the circuit to which the transformer primaries are connected via terminals $P_1$, $P_2$, an A.C. source (not shown) supplies 73 volts at 400 c./s. to terminals $A_1$, $A_2$ leading to a circuit comprising, in sequence, fuse 10 relay contacts RLA2, resistor R6, preset variable resistor RV4, resistor R8, terminal $P_1$, all the transformer primary windings in series, terminal $P_2$, resistors R7, R18, R19 in parallel, and relay contacts RLA3 to terminal $A_2$. Relay contacts RLA2, RLA3 are "make" contacts and terminal $A_2$ is also connected to earth. Test sockets $T_1$, $T_2$ are connected to the ends of resistor R6 to permit easy attachment of a high-resistance voltmeter for use when setting the current in this circuit to the proper value, conveniently 400 ma. by adjustment of RV4.

Figure 5:
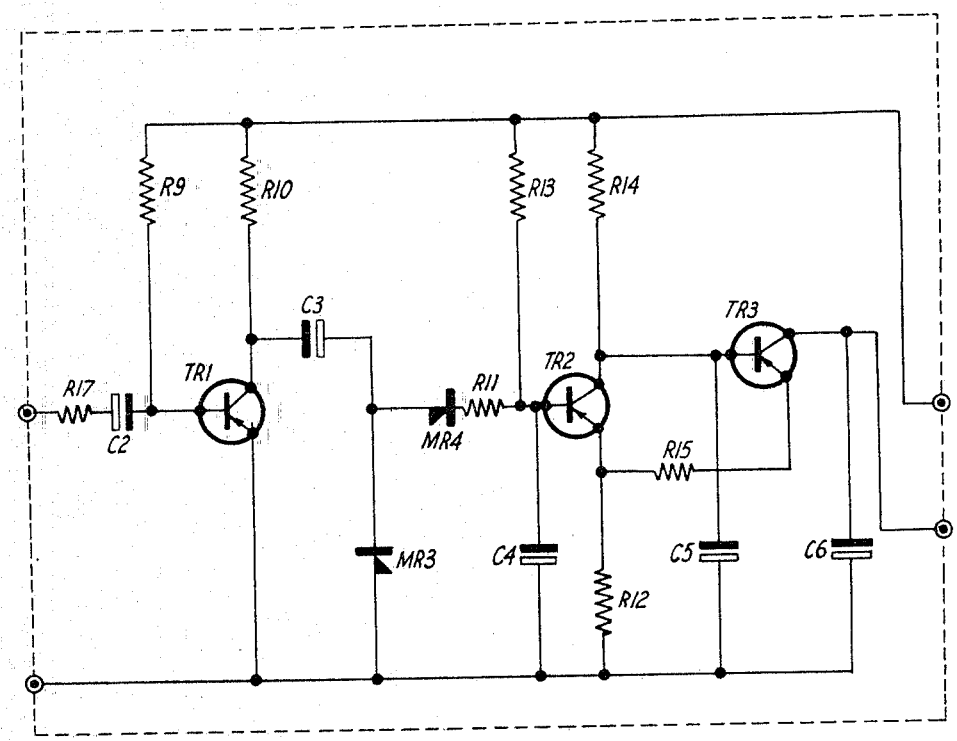
FIGURE 5 is a circuit diagram of an amplifier for the circuit of FIGURE 4.

A transistor amplifier $A_S$ (see also FIG. 5) is provided as part of a supervisory circuit and has an input terminal I, output terminal O, negative supply terminal N, and positive supply terminal P. Power for the amplifier $A_S$ is derived from a D.C. source (not shown) connected to terminal DC1, DC2 of which the latter (positive) terminal is connected to earth and to the terminal $S_2$. The output terminal O (amplifier $A_S$) is connected to the negative terminal DC1 via a warning lamp 11, the input terminal I is connected to terminal $P_2$ and the positive (earthed) terminal P is connected to the end of parallel resistors R7, R18, R19 remote from terminal $P_2$.

Amplifier $A_S$ is therefore supplied with D.C. power from terminals DC1, DC2 which also supply other amplifiers to be referred to later and receive a 400 c./s. input signal in the form of the voltage developed across resistors R7, R18, R19 whenever 400 c./s. current is flowing in the transformer primary windings. When both the D.C. supply and input signal are present, the latter is amplified and an output appears at the output terminal O sufficient to light warning lamp 11. Extinction of the lamp 11 when the apparatus is required to be operative therefore convey a warning that the D.C. and/or the A.C. supply has failed.

As noted above, details are shown of only one circuit for bottom position indication although there is one such circuit for each control rod. The main component of this circuit is another transistor amplifier $A_{BPI}$ (see also FIG. 5) similar to the amplifier $A_S$ and supplied from the same D.C. source via terminals DC1, DC2. Input to amplifier $A_{BPI}$ is derived by connection of terminal $S_1$ to the amplifier input terminal I, terminal $S_2$ being connected to the positive (earthed) side of the D.C. supply for the amplifier, whenever A.C. voltage is induced in the secondary winding of the transformer connected between terminals $S_1$, $S_2$ as a result of the associated control rod reaching its bottom position. Any such input which will be a 400 c./s. signal, is amplified and fed from the amplifier output terminal O to an indicator device 12, conveniently for example an electromagnetic indicator. This indicator provides a visual signal when energised by output from the amplifier as a result of the control rod reaching its bottom position.

To allow for checking of the operation of amplifier $A_{BPI}$ and indicator 12 (or any of the amplifiers and indicators for other rods), a three-pole rotary switch CS1–CS3 is provided, this switch in normal operation of the apparatus being left in the position shown. When checking of a bottom position indicator circuit is required, switch CS1–CS3 is rotated to a position corresponding to the circuit to be checked, whenever this switch is away from its normal position shown, its first bank CS1 disconnects the coils of relay RLA from the terminals DC1, DC2 connected to the D.C. supply, so that inter alia contacts RLA2, RLA3 open to cut off A.C. supply to the transformer primary windings, and therefore amplifier $A_{BPI}$ (and corresponding amplifiers for other control rods) cannot receive any input from the transformer secondaries, whatever the rod positions may be. Bank CS3 of the switch, however, effects a connection between the input of the selected amplifier and the movable contact of a two-way switch SW, the other two terminals of switch SW being connected to terminals AC1, AC2 supplied from an A.C. source (not shown) with different voltages (relative to earth) corresponding respectively to input levels which should and should not give a bottom position indication when derived from the transformer secondary winding of a control rod. Thus when switch CS1–CS3 is moved to the position for testing amplifier $A_{BPI}$ and indicator 12, when switch SW is in the position shown, indicator 12 should give a bottom position indication i.e. the visual signal aforementioned, while movement of switch SW to its other position should cancel such indication.

It may here be noted that switch CS1–CS3 has more positions than the total number of control rods and associated bottom position indication circuits, one of the additional positions being that for testing amplifier $A_S$ in similar manner and the remaining positions permitting the testing of spare amplifiers; it will be noted that all the bottom position indication circuits have amplifiers of identical form and that only four external connections are needed to each of such amplifiers which therefore conveniently are built as plug-in units. In these circumstances, a few additional sockets may be provided for spare amplifiers, connected to switch CS1–CS3 for testing but not connected to any control rod transformer. To avoid such spare amplifiers being energised unnecessarily whenever the apparatus is in use, they are not permanently connected to both the D.C. supply terminals DC1, DC2, but receive their negative D.C. supply through appropriate contacts of switch bank CS1. Furthermore, a single indicator 13 is provided for checking the spare amplifiers, switch bank CS2 is arranged to provide a connection (not shown) between the indicator 13 and the output terminals of the spare amplifiers as requisite.

At the stage of operation mentioned above, it was noted that relay RLA ceased to be energised and relay contacts RLA2, RLA3 opened. Whenever this occurs, which may be when switch CS1–CS3 is moved from its normal position, as described, or when the A.C. supply at terminals $A_1$, $A_2$, fails, then contacts RLA4 also open while contacts RLA1 close, these contacts being in fact a "change-over" contact set of relay RLA. The effect of these contacts is to connect a terminal $F_1$ to either terminal $F_2$ or terminal $F_3$ according to whether relay RLA is energised or not, terminals $F_1$, $F_2$, $F_3$ may be connected to any desired fault indication circuit to give local and/or remote audible and/or visual warning of faulty operation in well-known manner.

There remains to be described the circuits for giving a general position indication and here a rotary selector switch SS1–SS3 is employed to connect the ends of the winding on formers 26 of any selected one of the control rods to an Anderson A.C. bridge circuit 20. The selected winding thus, in series with a variable resistor RV2, forms one arm of the bridge, the other three arms being provided by resistors R3, R4, R5. The arm opposite to that in which the winding is connected is shunted by resistor R16, preset variable resistor RV3, and capacitor C1 all in series.

The bridge is supplied with A.C. at 115 v., 400 c./s. from terminals AC3, AC4 via a fuse 21 and the normal position contacts of two poles K3, K4 of a four-pole changeover key switch K1–K4. Output is taken from the bridge at the junction between RV2 and R3, the junction RV3 and C1, and fed to an indicating meter M1 through the meter rectifier MR1 and the normal position contacts of the other two poles K1, K2 of said key switch. The meter M1 is shunted by two paths, respectively including resistor R1 and meter rectifier MR1 in series, and resistor R2 and preset variable resistor RV1 in series.

Bank SS3 of the switch SS1–SS3 is provided to prevent damage to the meter due to overload while the switch is being moved from one position to the next; banks SS1, SS2 are constructed as break-before-make switches, and therefore during movement of switch SS1–SS3 there are short periods of time when the bridge circuit 20 is very seriously unbalanced as one arm is open-circuited and therefore in the absence of some protective device an unduly large voltage would reach meter M1. The bank SS3 therefore is arranged to have a make-before-break action and has alternate contacts connected to opposite sides of meter M1, the movable contact being left unconnected. Thus when switch SS1–SS3 is at rest on any selected contacts bank SS3 has no effect on the meter circuit but whenever said switch is moved, the meter is short-circuited during the time banks SS1, SS2 are temporarily in open-circuit positions.

The selector switch SS1–SS3 is provided with as many positions as the number of control rods connected to terminal groups PC1, PC2 and with extra positions which on banks SS1, SS2 are connected to test or calibration coils (such as coil 22) of inductances corresponding to preselected rod positions. Switching to these extra positions allows checking of the operation of the circuit as for each test coil a known meter reading should of course be obtained, therefore by use of the extra positions, correct settings for the preset variable resistors may be found.

Key switch K1–K4 allows preliminary balancing of the bridge circuit on D.C. as when this switch is moved from its normal position, its poles K3, K4 disconnect the bridge from the A.C. supply and instead connect the bridge to the D.C. supply terminals DC1, DC2. Simultaneously poles K1, K2 connect the output of the bridge direct to meter M1 and its shunts, meter rectifier MR2 being bypassed.

In normal operation, the Anderson bridge having been balanced so that a zero or minimum reading of meter M1 is obtained with the bridge connected by switch SS1–SS3 to a control rod winding whose rod is at one end of its travel, upon movement of said rod (or movement of switch SS1–SS3 to connect the bridge to the coil of another control rod standing in a different position) the inductance presented by the control rod coil will change to a value representative of the new position of the rod (or of the position of the other control rod) and the bridge will be unbalanced to give an output again representative of the rod position which will therefore be indicated by the reading of meter M1 which can be directly calibrated in terms of control rod position.. Switch SS1–SS3 is fitted with a pointer knob or the like to indicate which rod is in the position shown by the reading of the meter M1 at any instant.

Suitable component values for the circuits described are as follows:

RESISTORS

| Component | Value, ohms | Tolerance, percent | Type | Rating, watts |
| --- | --- | --- | --- | --- |
| R1 | 18 | ±5 | Carbon | ¼ |
| R2 | 470 | ±5 | do | 1.5 |
| R3 | 1.5K | ±1 | Wire-Wound | 4.5 |
| R4 | 680 | ±1 | do | 4.5 |
| R5 | 680 | ±1 | do | 4.5 |
| R6 | 10 | ±1 | do | 4.5 |
| R7 | 1 | ±1 | do | 3.0 |
| R8 | 22 | ±5 | do | 4.5 |
| R9 | 220K | ±5 | High Stability Carbon. | ¼ |
| R10 | 6.8K | ±5 | do | ¼ |
| R11 | 220 | ±5 | do | ¼ |
| R12 | 20 | ±5 | do | ¼ |
| R13 | 15K | ±5 | do | ¼ |
| R14 | 6.8K | ±5 | do | ¼ |
| R15 | 15 | ±5 | do | ¼ |
| R16 | 330 | ±5 | Wire-wound | 1.5 |
| R17 | 150 | ±5 | High Stability Carbon. | ¼ |
| R18 | 1 | ±1 | Wire-wound | 3.0 |
| R19 | 1.5 | ±1 | do | 3.0 |
| RV1 | 1K | ±5 | do | 2½ |
| RV2 | 1K | ±5 | do | 2½ |
| RV3 | 500 | ±5 | do | ½ |
| RV4 | 47 | ±5 | do | 10 |

(N.B. Resistors R7, R18, R19 may of course be substituted by a single wire-wound resistor of 0.375 ohms, ±1% rated at not less than 8 watts; the arrangement shown however employs resistors of values which may be more readily obtainable.

CONDENSERS

| Component | Value, μf. | Tolerance, percent | Type | Rating |
| --- | --- | --- | --- | --- |
| C1 | 0.1 | ±1 | Paper | 100 v., A.C. |
| C2 | 2.5 | ±20 | Electrolytic | 25 v., D.C. |
| C3 | 2.5 | ±20 | do | 25 v., D.C. |
| C4 | 50 | ±20 | do | 12 v., D.C. |
| C5 | 250 | ±20 | do | 15 v., D.C. |
| C6 | 50 | ±20 | do | 70 v., D.C. |

| | Component | Type |
| --- | --- | --- |
| Rectifiers | MR1 | OAa. (Mullard). |
| | MR2 | 10m 5 Instrument. |
| | MR3 | ZS10A (Ferranti). |
| | MR4 | ZS10A (Ferranti). |
| | MR5 | G.E.C. Type B1P1. |
| Relay | RLA | Ericsson N22364. |
| Transistors | TR1+2 | OC77 (Mullard). |
| | TR3 | OC29 (Mullard). |

It will be seen from the above description that an efficient and relatively simple indicator device has been provided, applicable in cases where remote indications of position are required as readily as in cases where the indicator is relatively close to the component whose position is to be indicated. Moreover, as the connections between the position sensing unit and the indicator circuits are purely electrical, no difficulties arise if ambient physical conditions e.g. of temperature or pressure are different at the locations of the sensing unit and the actual indicator, as suitable connecting cables can readily be passed through any necessary shielding walls or the like.

One particular application of this indicator is to nuclear reactor control rod technology, but the indicator can be used wherever it is required to know accurately the position of a hidden member, for example in testing the depth of liquids in tanks, or in finding the position of a drill in drilling rock strata.

In the case of a reactor the importance of accurate bottom position indication lies in the fact that the control rods have to be able to reach their fully bottommost position with certainty and rapidity in the case of reactor shut-down. It is therefore essential to be able to test, prior to any emergency shut-down, whether the control rods are capable of reaching their fully bottom positions.

I claim:

1. A position indicating device for a nuclear reactor having at least one control rod comprising a hollow extension of magnetic material secured to said control rod and having significantly different internal dimensions over a part of its length, fixed structure relative to which said rod and extension are movable, a pair of formers secured to said fixed structure, windings on said formers to form part of a transformer having one of its windings in two parts connected in series opposition, means for supplying A.C. to said windings, means for indicating the presence of an output from said transformer, a further series of windings on formers also secured to said fixed structure and spaced longitudinally therealong, said further windings being connected in series, and means for indicating variations in the inductance of the series-connected further windings, the relative position of the various parts being such that when the rod is in one particular position the transformer is partly within that part of the hollow extension having different internal dimensions.

2. A position indicating device for a nuclear reactor having at least one control rod comprising a hollow extension of magnetic material secured to said control rod and having significantly different internal dimensions over a part of its length, fixed structure relative to which said rod and extension are movable, a pair of formers secured to said fixed structure, windings on said formers to form part of a transformer having one of its windings in two parts connected in series opposition, means for supplying A.C. to said windings, means including an amplifier for indicating the presence of an output from said transformer, and a further amplifier arranged to operate from the same power supplies as the first-mentioned amplifier, the input of said further amplifier being connected to the A.C. supplying means and the output thereof being connected to an indicator, the relative positions of the various parts being such that when the rod is in one particular position the transformer is partly within that part of the hollow extension having different internal dimensions.

3. A position indicating device for a nuclear reactor having at least one control rod comprising a hollow extension of magnetic material secured to said control rod and having significantly different internal dimensions over a part of its length, fixed structure relative to which said rod and extension are movable, a pair of formers secured to said fixed structure windings on said formers to form part of a transformer having one of its windings in two parts connected in series opposition, means for supplying A.C. to said windings, means for indicating the presence of an output from said transformer, a further series of windings on formers also secured to said fixed structure and spaced longitudinally therealong, said further windings being connected in series, and means for indicating variations in the inductance of the series-connected further windings, the relative position of the various parts being such that when the rod is in one particular position the transformer is partly within that part of the hollow extension having different internal dimensions, and the length of said part of the hollow extension being at least equal to the length of said further series of windings.

4. A position indicating device for a nuclear reactor having at least one control rod comprising a hollow extension of magnetic material secured to said control rod and having significantly different internal dimensions over a part of its length, fixed structure relative to which said rod and extension are movable, a pair of formers secured to said fixed structure, windings on said formers to form part of a transformer having one of its windings in two parts connected in series opposition, means for supplying A.C. to said windings, means including an amplifier for indicating the presence of an output from said transformer, a further amplifier arranged to operate from the same power supplies as the first-mentioned amplifier, the input of said further amplifier being connected to the A.C. supplying means and the output thereof being connected to an indicator, a further series of windings on formers also secured to said fixed structure and spaced longitudinally therealong, said further windings being connected in series, and means for indicating variations in the inductance of the series-connected further windings, the relative position of the various parts being such that when the rod is in one particular position the transformer is partly within that part of the hollow extension having different internal dimensions and the length of said part of the hollow extension being at least equal to the length of said further series of windings.

5. A position indicating device for a nuclear reactor having a plurality of control rods comprising a hollow extension of magnetic material secured to each control rod and having significantly different internal dimensions over a part of its length, fixed structure relative to which the rods and extensions are movable, a pair of formers secured to said fixed structure adjacent each of said rods, coils on said formers to form part of a transformer having one of its windings in two parts connected in series opposition, means for supplying A.C. to said windings, and separate means including an amplifier for indicating the presence of an output from each of the transformers, the relative positions of the various parts being such that when any one of said rods is in one particular position the associated transformer is partly within that part of the hollow extension of said one rod having different internal dimensions.

6. A position indicating device for a nuclear reactor having a plurality of control rods comprising a hollow extension of magnetic material secured to each control rod and having significantly different internal dimensions over a part of its length, fixed structure relative to which the rods and extensions are movable, a pair of formers secured to said fixed structure adjacent each of said rods, coils on said formers to form part of a transformer having one of its windings in two parts connected in series opposition means for supplying A.C. to said windings, separate means including an amplifier for indicating the presence of an output from each of the transformers, test input means switchable to deliver either of two voltages corresponding to desired operate and non-operate levels for the indicating means, and means for disabling the A.C. supplying means and simultaneously connecting any one of the transformers to said test input means, the relative positions of the various parts being such that when any one of said rods is in one particular position the associated transformer is partly within that part of the hollow extension of said one rod having different internal dimensions.

7. A position indicating device for a nuclear reactor having at least one control rod comprising a hollow extension of magnetic material secured to said control rod and having significantly different internal dimensions over a part of its length, fixed structure relative to which said rod and extension are movable, a pair of formers secured to said fixed structure, coils on said formers to form part of a transformer having one of its windings in two parts connected in series opposition, a further series of windings on formers also secured to said fixed structure and spaced longitudinally therealong said further windings being connected in series means for supplying A.C. to said transformer means including an amplifier for indicating the presence of an output from said transformer, an A.C. bridge circuit having the series-connected further windings connected in one of its arms and a meter connected across a diagonal of said bridge, the relative position of the various parts being such that when the rod is in one particular position the transformer is partly within that part of the hollow extension having different internal dimensions and the length of said part of the hollow extension being at least equal to the length of said further series of windings, and the bridge circuit being balanced when the control rod is at one extreme position but increasingly unbalanced as the control rod is moved away from said extreme position to give a progressively increasing meter reading indicating the position of the control rod.

References Cited by the Examiner

UNITED STATES PATENTS

| | | | |
|---|---|---|---|
| 2,430,757 | 11/1947 | Conrad et al. | 340—196 |
| 2,494,579 | 1/1950 | Pimlott et al. | 340—196 |
| 2,911,632 | 11/1959 | Levine | 340—196 |
| 2,961,589 | 11/1960 | Ghalib et al. | 176—20 X |

OTHER REFERENCES

NYO-8503, AEC document, Dec. 2, 1957, pp. iii and 5–12.

Schultz, "Control of Nuclear Reactors and Power Plants," 1955, p. 103, publ. by McGraw-Hill, 1st edition.

CARL D. QUARFORTH, *Primary Examiner*.

ROGER L. CAMPBELL, RUBEN EPSTEIN, *Examiners*.

BENJAMIN R. PADGETT, J. F. DAVIS, M. R. DINNIN, H. E. BEHREND, *Assistant Examiners*.